Nov. 24, 1959     H. KLAUE     2,913,914
RECIPROCATING PISTON INTERNAL COMBUSTION ENGINE
Filed Feb. 17, 1956     5 Sheets-Sheet 1

Inventor:
Hermann Klaue
by
Freeman & Menores

Nov. 24, 1959  H. KLAUE  2,913,914
RECIPROCATING PISTON INTERNAL COMBUSTION ENGINE
Filed Feb. 17, 1956  5 Sheets-Sheet 2

Inventor:
Hermann Klaue
by
Freeman & Mermorth

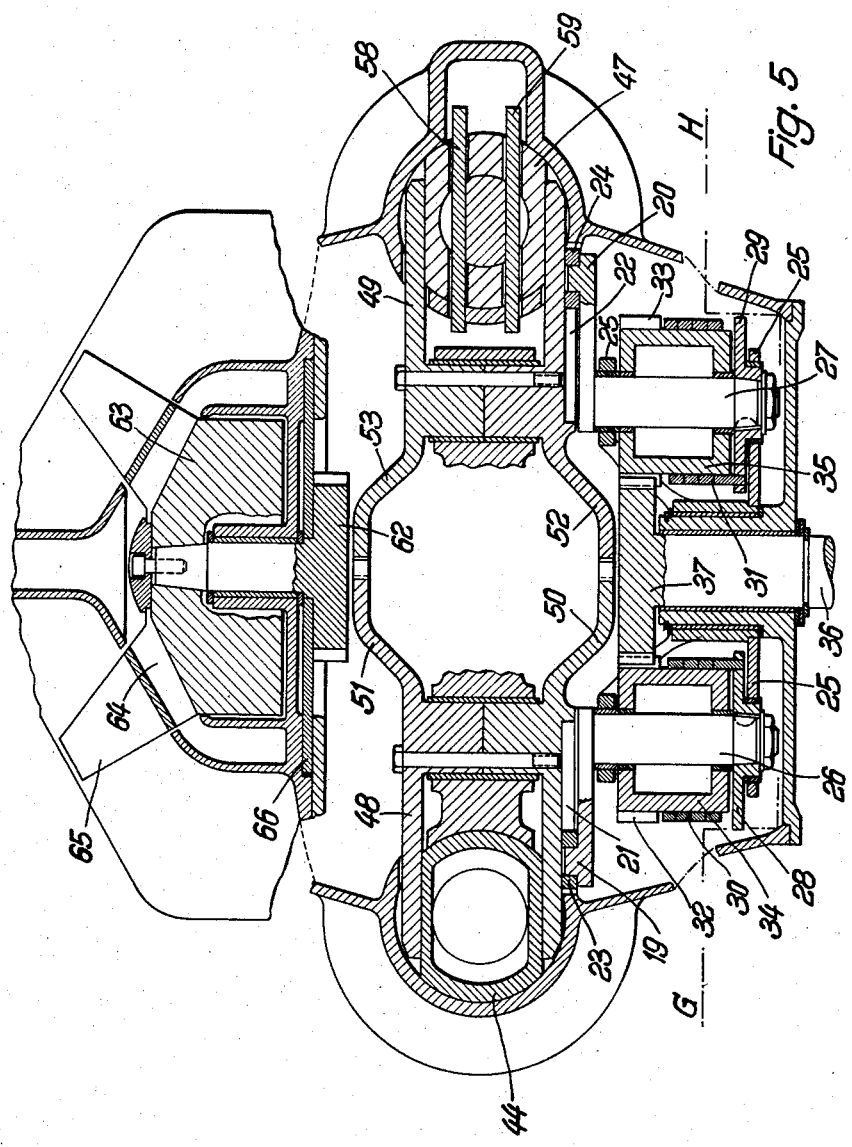

Nov. 24, 1959　　　　　H. KLAUE　　　　2,913,914
RECIPROCATING PISTON INTERNAL COMBUSTION ENGINE
Filed Feb. 17, 1956　　　　　　　　　　5 Sheets-Sheet 5
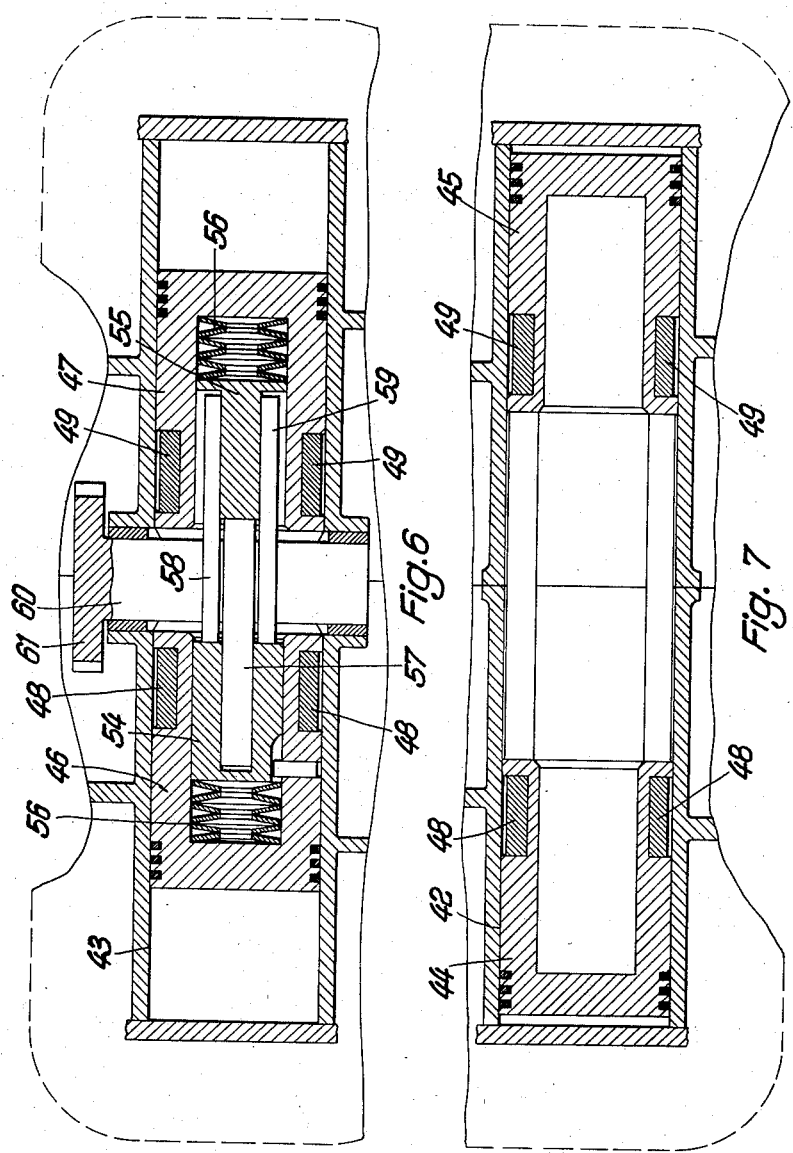
Inventor:
Hermann Klaue United States Patent Office 2,913,914
Patented Nov. 24, 1959

2,913,914
RECIPROCATING PISTON INTERNAL COMBUSTION ENGINE

Hermann Klaue, Überlingen (Bodensee), Germany

Application February 17, 1956, Serial No. 566,285

Claims priority, application Germany February 26, 1955

3 Claims. (Cl. 74—129)

As opposed to aeroplane drives, in which operation at optimum efficiency is required only over a certain speed range, maximum efficiency is required over the whole speed range in land vehicle drives. For reasons of efficiency the gas turbine is excluded at least for small land vehicles, and even in the case of large vehicles some years will still elapse in basic development before series production can be expected, if ever.

The piston sliding up and down in a cylinder, and sealed by piston rings is the part of an engine which gives rise to the least disturbances. Pistons allow very high compression, and thus the attainment of a thermal efficiency which can never be reached by a turbine. The disadvantage of present-day piston engines is not in the piston itself, but can be traced to transmission losses arising from the mechanical transmission of force to the crankshaft (above all lateral forces). A further disadvantage of existing piston engines is the constant compression ratio, which requires the use in engines working on the Otto cycle of external ignition, and in diesel engines, of special measures for preparing the fuel for ignition (ante-chamber, air storage means and the like).

The invention has for its object of avoiding the above mentioned disadvantages in piston engines, and producing a reciprocating internal combustion engine allowing infinitely variable transmission of piston power to a take-off shaft.

The solution according to the invention is characterised in that the piston is coupled to the take-off shaft by means of oscillating levers, lever arms of adjustable effective length and couplings acting only in one direction of rotation, and opening and closing mechanically, while the operative connection between the piston and the take-off shaft is interrupted only at the moment of piston reversal.

Coupling springs are intended to be used as couplings and are so wound as to transmit torque only in one piston movement direction. Each coupling spring is attached to a flange fast with the lever of which the end carries a sliding member displaceably arranged in a groove in the oscillating lever coupled to the free piston. A gearwheel is rigidly connected to a drum, and is coupled by means of a pair of gearwheels to the take-off shaft, and is supported on the shaft carrying the attachment flange of the spring, and the coupling spring is wound on this drum. The piston or pistons are coupled by means of elastic connecting rods to a crankshaft which is not connected to the take-off shaft, but which serves only to drive the flywheel and auxiliary machine, such for example as the fan, the generator, the injection and oil pump. Such an engine has the following advantages as compared with known internal combustion engines:

(1) The engine can work with self-ignition. Poor-quality fuel can thus be used. As opposed to existing Otto and diesel engines, there is no rigid connection between the piston and the take-off at the moment of ignition itself; operative connection only exists at the moment when the piston moving downwards has reached the speed required for engagement of the spring coupling. High thermal efficiency is achieved because of the high compression necessary for self-ignition.

(2) The working piston works at constant frequency because of the infinitely variable transmission. Thermal advantages are thus obtained because of the constant loading. In addition, combustion can be adapted to the frequency of the piston, which improves efficiency, especially in two-stroke operation.

(3) The piston only transmits small lateral forces to the cylinder walls, so that mechanical losses caused thereby do not occur. The working frequency can consequently be increased.

Two constructional examples of the invention are illustrated in the accompanying drawings in which:

Figs. 4 to 7 illustrate an example with two oscillating pairs of pistons in which complete balance of the reciprocating masses is ensured.

Figure 1:
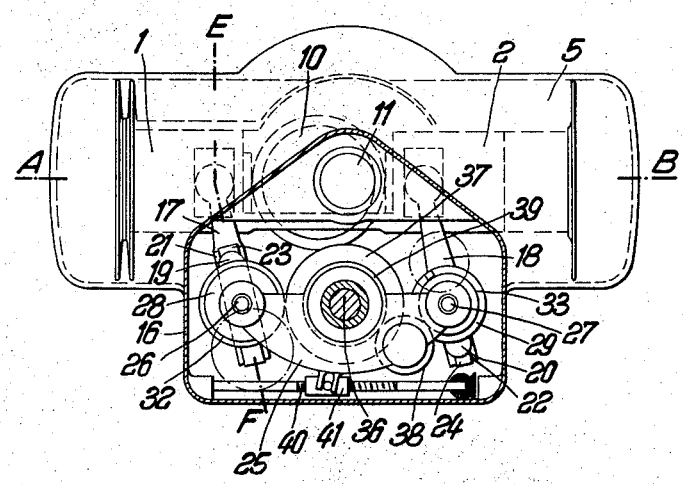
Figs. 1 to 3, 8 and 9 show an internal combustion engine with a double-acting free piston.
Figure 2:
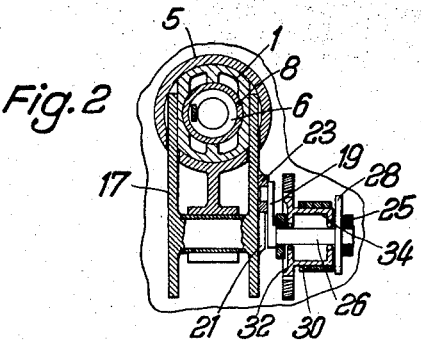
Figure 3:
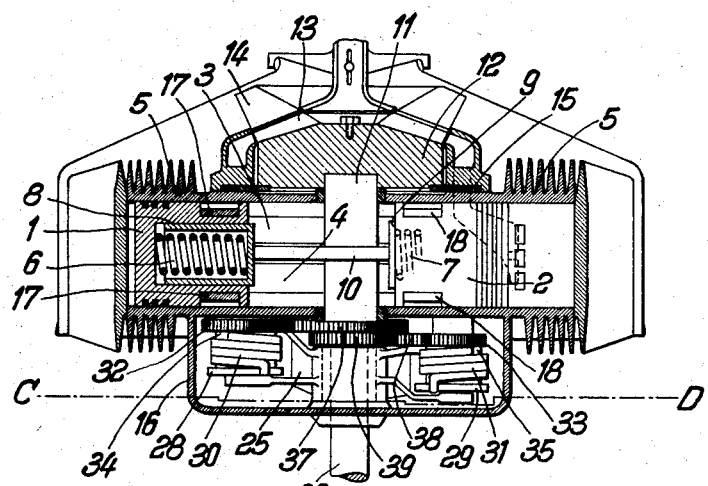

Fig. 1 is an elevational view of the internal combustion engine with a double piston and a section through the take-off housing along the line C—D in Fig. 3, the infinitely variable take-off being visible. Fig. 2 is a cross-section along the line E—F in Fig. 1 through the take-off on one side. A longitudinal section through the internal combustion engine along the line A—B of Fig. 1 is illustrated in Fig. 3.

Figure 8:
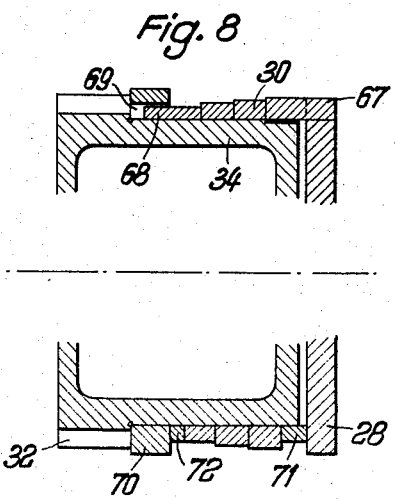
Figure 9:
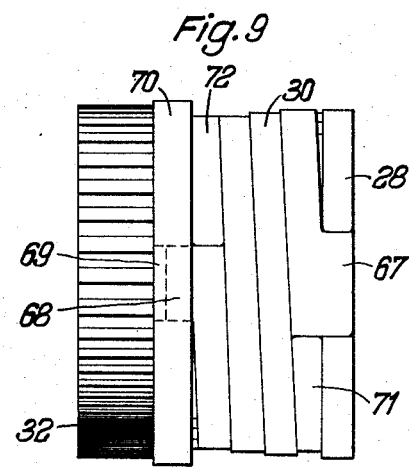

Fig. 8 shows a longitudinal section along the axis of the drum carrying the coupling spring, and rigidly connected to the driving gearwheel, while Fig. 9 illustrates a plan view of this drum.

Referring to Figures 1 to 3, 8 and 9, the double piston 1 and 2 is connected by the webs 3 and 4. The double piston oscillates to and fro in the cylinder 5, and drives the eccentric 10 on the eccentric shaft 11 by means of springs 6 and 7 and sliding sleeves 8 and 9, the eccentric shaft being coupled to the flywheel in the form of a starter generator 12, the supercharger fan 13 and the cooling fan 14. The rotary valve 15 controlling the inlet into the cylinder 5 is also driven from the flywheel.

Driving power is transmitted towards the driving shaft by means of fork levers 17 and 18 which are supported in the housing 16, and by the oscillating levers 19 and 20. For this purpose grooves 21 and 22 are provided in the fork levers 17 and 18 respectively. Longitudinally displaceable sliding members 23 and 24 are arranged in these grooves, the oscillating levers 19 and 20 being pivotably coupled to these sliding members. The oscillating levers 19 and 20 are supported in an adjustably positionable pivoted two arm lever 25, and are operatively connected by means of shafts 26 and 27 to the flanges 28 and 29, to which the coupling springs 30 and 31 are in turn attached. The shafts 26 and 27 carry the gearwheels 32 and 33, each of which is rigidly coupled to a drum 34 and 35 respectively. This drum is driven in one direction of rotation by the oscillating coupling spring 30 or 31, oscillating with the flange 28, 29.

Driving torque is transmitted from the gearwheel 32 to the gearwheel 37 fast with the take-off shaft 36, and from the gearwheel 33 by means of the intermediate wheel 38 to the gearwheel 39, likewise fast with the take-off shaft. Pivoting of the lever 25 causes the sliding members 23 and 24 to slide along in the grooves 21 and 22. This alters the path length of force transmission from the fork ends 17 and 18 to the oscillating levers 19 and 20, and thus alters the transmission ratio. If the gearwheels 32 and 33 have reached the position indicated by the dot and dash line in Fig. 1, idling is set up.

Adjustment of the lever 25 is effected in the example illustrated, as can be seen in Fig. 1, by means of a threaded spindle 40 and a nut 41. Adjustment could naturally also be automatic, in dependence either on torque or speed.

Figs. 8 and 9 show that the coupling springs 30 and 31 are provided with a ring 70 sliding on the drum 34 or 35, intended to shorten the closing time of the coupling springs, and thus to increase the efficiency of force transmission by avoiding frictional losses. The example of the drum 34 and the coupling spring 30 illustrates that the latter is connected by means of an extension 67 to the flange 28, which is operatively connected to the oscillating lever 19. An extension 68 is arranged on the opposite side of the spring 30, engages in a cut-out 69 in the ring 70 sliding on the drum 34, and provides a coupling in this manner. The drum 34 is fast with the driving gearwheel 32. The oscillating mass of the ring 70 provides quick opening and closing of the coupling spring 30. The packing segments 71 and 72 are provided to prevent the coupling spring 30 from tilting.

Figure 4:
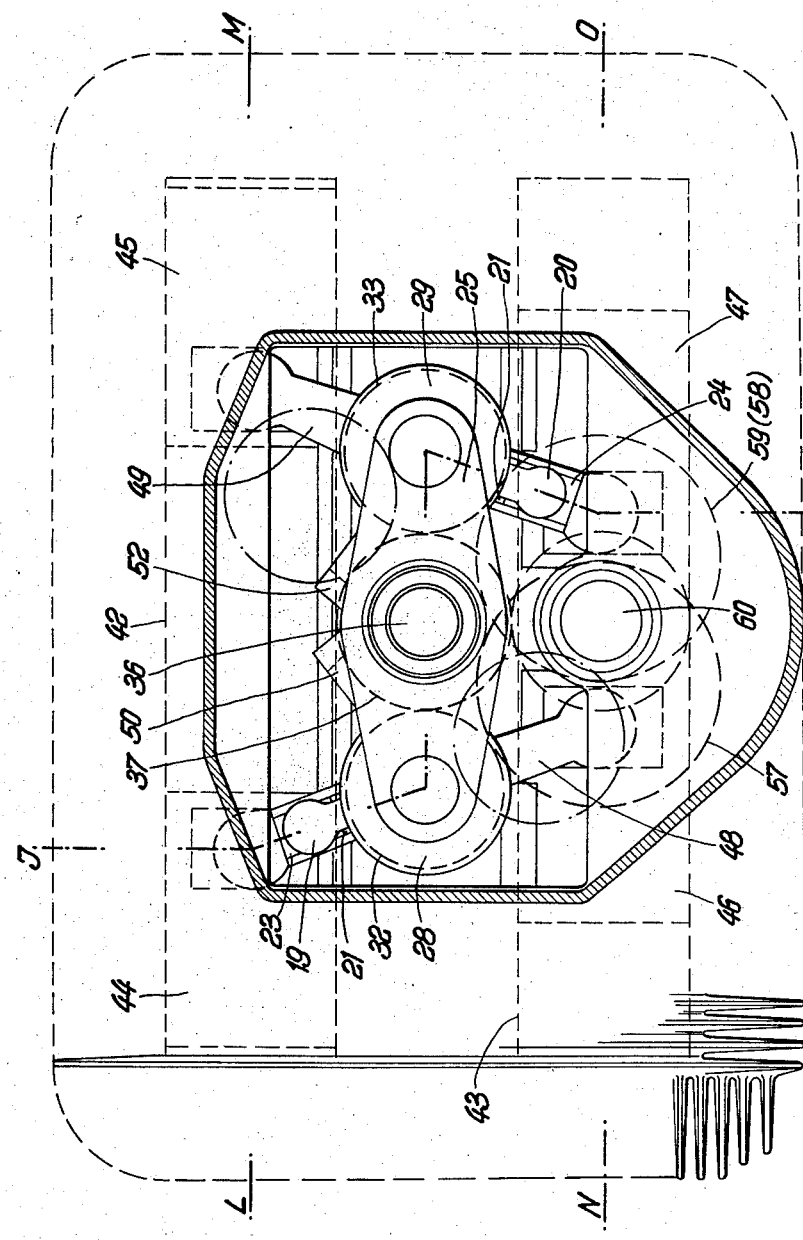

Fig. 4 is a cross-section of the other constructional example of the invention through the take-off housing along the line G—H in Fig. 5;

Fig. 5 is a longitudinal section along the line J—K in Fig. 4;

Fig. 6 is a longitudinal section through the upper cylinder along the line N—O in Fig. 4, and Fig. 7 is a longitudinal section through the lower cylinder along the line L—M in Fig. 4.

In the constructional example of Figs. 4 to 7, complete balance of the oscillating masses is achieved, as opposed to the example illustrated in Figs. 1–3, 8 and 9. The pistons 44 and 45 oscillate in the cylinder 42, and the pistons 46 and 47 in the cylinder 43. The piston 44 is connected to the piston 46 by the fork lever 48, and the piston 45 to the piston 47 by the fork lever 49. The fork levers 48 and 49 are operatively connected by way of toothed extensions 50, 51 and 52, 53.

The pistons 46 and 47 drive the eccentrics 57, 58 and 59 by way of pressure pieces 54 and 55, supported by plate springs 56 and carried in the pistons, the eccentrics being keyed fast to the eccentric shaft 60. The eccentric shaft is connected by means of a pair of gearwheels 61, 62 to the starter generator 63 serving as a flywheel and to the supercharger fan 64 and cooling fan 65 connected to the starter generator. The rotary inlet valve 66 for controlling the inlet is also driven by the gearwheel 62. No description is required here, since the take-off and alteration of transmission ratio are constructed exactly as in the constructional example illustrated in Figs. 1 to 3. Corresponding parts are identically designated. The reversing wheel 38 and thus also the gearwheel 39 can, however, be omitted.

In the example according to Figs. 4 to 7 it would be possible to construct the eccentrics as cams. The piston movement controlled by the cams can then be matched to the piston movement required for uniform transmission of piston forces by means of the coupling springs 30 and 31 to the take-off gearwheels 32 and 33, which causes relaxation of the springs 56. In large engines the frictional forces arising between the pressure pieces 54 and 55 and the eccentrics or cams 57, 58 and 59 can be reduced by rollers arranged on the pressure pieces.

The method of operation of the internal combustion engine constructed according to the invention is described hereinafter with reference to the constructional example illustrated in Figs. 4 to 7.

The supercharger fan is driven by the pair of gearwheels 61, 62 by the eccentric shaft 60 driven by the pistons. The supercharger fan aspirates the air-fuel mixture, or pure air in an engine with fuel injection, and forces it through ducts controlled by the rotary inlet valve 66 into the cylinders 42 and 43. The fuel mixture or the air into which fuel is injected during the compression stroke is compressed by the pistons 44 and 45 or 46 and 47 until self ignition, or ignition by a means of ignition (for example a spark plug) takes place. The combustion which thereupon sets in causes all the pistons to alter their direction of movement. While the pair of pistons over which ignition took place now moves inwards, the other pair of pistons moves outwards. Rigid connection between the pistons is ensured by the fork levers 48 and 49 and the toothed extensions 50, 51, 52 and 53.

The kinetic energy of the pistons is transmitted to a small extent by the springs 56 to the eccentric shafts 57, 58 and 59. The auxiliary drives, such for example as the dynamo, the supercharging and cooling fans and the flywheel, are driven by these eccentric shafts. Resilient connection between the pistons and eccentric shafts is required in order that the piston speed can match the take-off speed of the drive. The fork levers 17 and 18 are rigidly connected to the oscillating levers 19 and 20 by means of the sliding members 23 and 24. The oscillating levers 19 and 20 transmit work from the pistons by means of the flanges 28 and 29 to the coupling springs 30 and 31. The work is thence passed on to the drums 34 and 35, the gearwheels 32 and 33 and the take-off gearwheel 37.

Adjustment of the lever 25 infinitely varies the stroke transmitted from the fork levers 17 and 18 to the oscillating levers 19 and 20. The position of the flanges 28, 29 illustrated in dash and dot lines in Fig. 1 shows the zero position of the drive. In this position the fork levers 17 and 18 oscillate about the central axis of the sliding members 23 and 24. The internal combustion engine is thus idling. Only when the lever 25 is tilted out of the idling position (shown in broken lines) is kinetic energy transmitted to the take-off.

With the engine described it is possible to work with constant piston pulse speed independently of load, and merely alter the engine charge and the position of the lever 25 for regulation purposes. Since there is no connection between the internal combustion engine and the take-off at the moment of ignition of the mixture, it is possible to work with very high compression, which makes it possible to achieve high thermal efficiency. The high combustion pressures arising because of the high compression cannot have a damaging effect on the drive mechanism, as in the case of normal piston internal combustion engines, since the pistons are not coupled to the take-off at the moment of reversal of movement. The pistons must first receive by way of combustion energy the speed to cause the coupling springs 30 and 31 to couple to the drums 34 and 35.

The coupling arrangement is especially described with reference to Figs. 8 and 9. The drums 34 and 35 are operatively connected to the take-off shaft by the gearwheels 32 and 33. They thus rotate continuously. The flanges 28 and 29, on the other hand, oscillate to and fro in step with the piston movement. The coupling springs 30 and 31 transmit torque in the same direction of rotation to the take-off gearwheel 37, displaced by 180° in relation to the direction of rotation of the eccentric shaft 60. The operative connection is interrupted only at the moment of reversal of movement of the pistons. In order to accelerate the opening and closing of the coupling springs, an oscillating mass designated by 70 in Figs. 8 and 9 is arranged on the end of the coupling spring. This mass must be constantly accelerated and retarded in step with the piston movement. This effects accelerated opening and closing of the coupling spring, and prevents unnecessary abrasion of the coupling spring on the drum.

I claim:

1. A power transmission mechanism, for use in connection with a reciprocating piston internal combustion engine having a freely reciprocating double piston, a driven shaft, oscillating levers oscillating in a plane of the axis of the reciprocating pistons and adapted to be in abutment contact with and immediately to be driven by said pistons, clutch means, and two sets of gears each driven from an oscillating lever for driving said shaft during each piston stroke, said oscillating levers including arms of adjustable effective length to vary the amplitude of the oscillations imparted to said levers for stepless adjustment of the power transmitted to the driven shaft.

2. In a mechanism as claimed in claim 1, said clutch means comprising unidirectional transfer means including two drums each driven from an oscillating lever, one of said gears being mounted adjacent a drum, and a helical spring arranged to transmit unidirectionally to said drum the gear oscillating impulses received from an oscillating lever.

3. In a mechanism as claimed in claim 2, a shaft for each gear oscillated in opposite directions by an oscillating lever, a flange connected to each oscillating shaft, each helical spring being disposed between said flange and a drum for unidirectional transmission of oscillating impulses between said flange and said drum.

References Cited in the file of this patent

UNITED STATES PATENTS

| | | |
|---|---|---|
| 790,325 | Steele | May 23, 1905 |
| 829,201 | Goddu | Aug. 21, 1906 |
| 1,023,855 | King | Apr. 23, 1912 |
| 1,304,129 | Walk | May 20, 1919 |
| 1,660,487 | Gauthier | Feb. 28, 1928 |
| 1,686,455 | Lieber | Oct. 2, 1928 |
| 1,699,803 | Myers | Jan. 22, 1929 |
| 2,355,011 | Putnam | Aug. 1, 1944 |
| 2,551,739 | Harlan | May 8, 1951 |
| 2,672,062 | De Marchi | Mar. 16, 1954 |